(12) United States Patent
Agrawal et al.

(10) Patent No.: US 7,016,396 B2
(45) Date of Patent: Mar. 21, 2006

(54) UNITARY BLUETOOTH-ENABLED TERMINAL HAVING MULTIPLE RADIO INTERFACES

(75) Inventors: Prathima Agrawal, New Providence, NJ (US); David Famolari, Montclair, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 967 days.

(21) Appl. No.: 10/054,134

(22) Filed: Nov. 13, 2001

(65) Prior Publication Data

US 2003/0091096 A1    May 15, 2003

(51) Int. Cl.
*H04B 1/69*    (2006.01)
*H04B 1/707*   (2006.01)
*H04B 1/713*   (2006.01)

(52) U.S. Cl. .................... 375/135; 375/133; 375/132

(58) Field of Classification Search ............. 375/132, 375/133, 134, 135; 370/344, 330, 480; 455/103
See application file for complete search history.

(56) References Cited

U.S. PATENT DOCUMENTS

| 6,393,261 B1 * | 5/2002 | Lewis .................. 455/103 |
| 6,859,450 B1 * | 2/2005 | Mansfield ............. 370/344 |
| 6,891,857 B1 * | 5/2005 | Nevo et al. ........... 370/480 |
| 2002/0150147 A1 * | 10/2002 | Liang ................. 375/133 |

* cited by examiner

Primary Examiner—Phuong Phu
(74) Attorney, Agent, or Firm—Joseph Giordano; James W. Falk

(57) ABSTRACT

A Bluetooth-enabled terminal having a radio manager for minimizing frequency collisions between channel hopping patterns transmitted over plural channels established between such terminal and correspondent Bluetooth devices is described. The radio manager extracts successive sets of projected future N—time slot segments of the respective Bluetooth channel hopping patterns. Each extracted set is tested to detect a time slot, if any, where frequency hops of the segments of the set coincide, indicating a frequency collision. When a collision time slot is detected, the radio manager generates a marker which triggers an alteration of the frequency hops that would otherwise be exhibited by a subset of the generated channel hopping patterns in such detected time slot. Such terminal may optionally be provided with an additional network interface to define a collision-resistant Bluetooth access point.

4 Claims, 6 Drawing Sheets

UNITARY BLUETOOTH-ENABLED TERMINAL HAVING MULTIPLE RADIO INTERFACES

BACKGROUND OF THE INVENTION

This invention relates to packet transmission systems operating with Bluetooth transmission protocols and more particularly to Bluetooth-enabled devices employed in the implementation of such systems.

As is well known, devices utilizing Bluetooth communication protocols have evolved in recent years to facilitate instantaneous short-range wireless digital communications among a wide range of dissimilar devices in a robust and secure manner.

Bluetooth-enabled devices utilize spread-spectrum frequency hopping techniques to exchange data with other Bluetooth-enabled devices after establishment of a radio connection between radio modules associated with the transmitting and receiving devices. Pursuant to Bluetooth protocols, the device initiating the connection (the master) establishes and controls communication with other connected devices (the slaves) in a piconet by transmitting packets in a unique channel hopping pattern whose frequency hops in each successive time slot are distributed in a quasi-random manner. The time slots used by the master and the slaves in a piconet for the common channel hopping pattern are synchronized.

A Bluetooth master using a single radio module cannot form simultaneous connections with devices on separate piconets. Nor has it been practical, up to now, to simultaneously operate separate radio modules that are co-located on a single device. One reason for this is that the simultaneously transmitted channel hopping patterns would be statistically subject to frequency "collisions" in certain time slots and thereby to an attendant loss of transmitted information.

SUMMARY OF THE INVENTION

The present invention provides a unitary Bluetooth-enabled terminal that includes a plurality of independent radio interfaces associated with radio modules that provide collision-free simultaneous connections with Bluetooth-enabled device(s) on separate piconets. In a first embodiment, each radio interface is coupled to a baseband controller which generates, from a common system clock, a unique channel hopping pattern that is used by that radio interface to determine transmission frequencies used in subsequent time slots. Each radio interface simultaneously sends radio signals in frequencies determined by its own independent channel hopping pattern.

If two or more of such radio interfaces send information at the same time and on the same frequency, frequency collision occurs. In accordance with the invention, frequency collision on the respective channels is avoided by providing the terminal with a radio manager that extracts segments of the respective channel hopping patterns occurring over a selectable number of future time slots. The radio manager generates, from a comparison of the respective extracted segments, a marker indicative of a time slot(s), if any, where a collision between frequency hops on the respective channels will occur. An adjustment circuit responsive to the marker causes the baseband controller to alter the frequency hops that would otherwise be exhibited by a subset of such channels in such predicted time slot, thereby avoiding the collision that would otherwise occur.

Advantageously, the terminal may be implemented as a multiple-interface Bluetooth access point. This is accomplished by incorporating an additional interface (wired or wireless) to a backbone network, thereby permitting the establishment of a connection through the terminal between a selected one of the radio modules and the backbone network.

BRIEF DESCRIPTION OF THE DRAWING

The invention is further illustrated in the following detailed description taken in conjunction with the appended drawing, in which.

DETAILED DESCRIPTION

Figure 1:
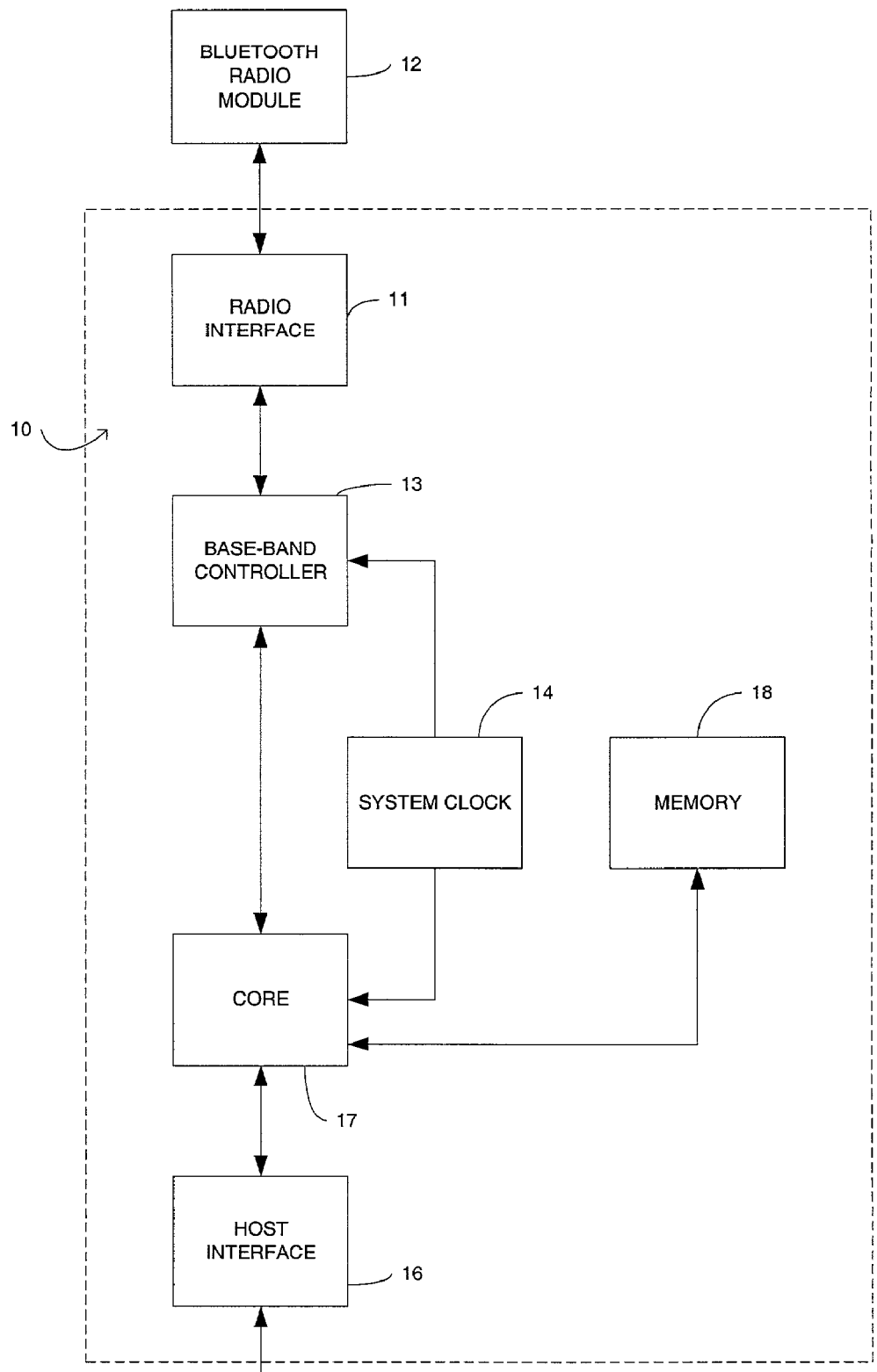
FIG. 1 is a block diagram of an exemplary prior art Bluetooth-enabled device.

Referring now to the drawings, FIG. 1 shows a conventional Bluetooth-enabled device 10 having a radio interface 11 which couples packets to and from an external Bluetooth radio module 12. The module 12 is adapted to transmit frequencies within the ISM band. The interface 11 is connected to a baseband controller 13, which implements known Bluetooth baseband protocols by modulating packets to be transmitted in a FH-CDMA channel hopping pattern after a connection is made between the module 12 and a Bluetooth-enabled slave device (not shown). Each successive time slot of such channel hopping pattern illustratively exhibits a quasi-randomly selected one of 79 different 1 MHz frequency hops within the ISM band.

The time slots of the channel hopping pattern are established by a system clock 14 coupled to the controller 13. The clock 14 may be illustratively embodied as a 28 bit counter with a clock rate in a range centered at 3.2 KHz. Each of the possible quasi-random frequency hopping patterns that may be generated by the controller 13 for use in the transmission link or channel associated with the radio module 12 illustratively corresponds to a unique count, or "tick", of the clock 14.

Packets to be transmitted by the device 10 through the radio module 12 are incident on the device through a host interface 16. Such incident packets are applied to the controller 13 through a conventional CPU core 17 that is associated with a memory 18.

The co-location of a plurality of radio interfaces in a single device to control a plurality of Bluetooth piconets with separate channel hopping patterns has not been practical in the past, since the Bluetooth devices that would be connected to each of the resulting multiple channels are independent and do not coordinate. Consequently, the simultaneous transmission of packets over the multiple channels established by such device would statistically exhibit identical frequency hops in certain future time slots. Because the co-located radio modules would be in close proximity to each other and therefore well within Bluetooth range, the collisions caused by the simultaneous occurrence of such frequency hops would cause a loss of packet communication during the time slots in question.

This drawback is minimized with the use of a unitary, Bluetooth-enabled terminal in accordance with the invention. In the illustrative embodiment shown in FIG. 2, such terminal is represented at 20. The terminal 20 has a plurality of independent radio interfaces, two of which are shown and identified with the numerals 11A and 11B, respectively. Each of the interfaces 11A and 11B is in communication with the output of a common baseband controller 13A, and is coupled to at least one external Bluetooth radio module. In the particular arrangement shown in FIG. 2, the interfaces 11A and 11B are respectively associated with a pair of radio modules 12A and 12B. The controller 13A, which receives data to be transmitted through a host interface 16A and a core 17A, modulates the frequencies of the radio modules 12A and 12B with separate channel hopping patterns that may be transmitted by such radio modules to associated "slave" devices (not shown) in different piconets in a collision-free manner as described below.

Figure 2:
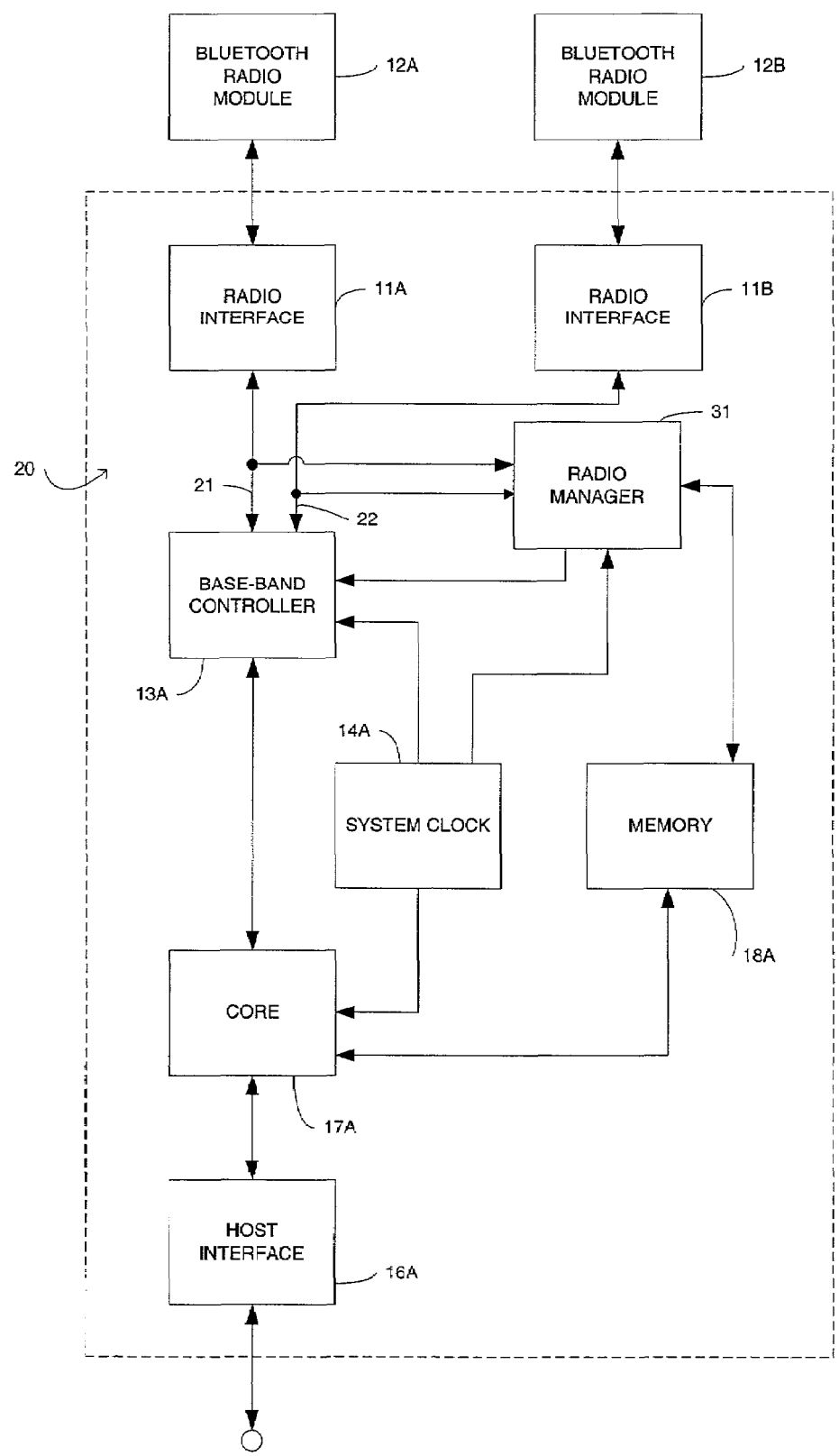
FIG. 2 is a block diagram of a unitary, multiple-interface Bluetooth-enabled terminal in accordance with the invention.

In particular, the controller 13A responds to different counts of a system clock 14A by generating, for the two-interface arrangement shown in FIG. 2, a pair of unique channel hopping patterns of the type indicated above. (The characteristics of the clock 14A may correspond to those of the clock 14 of FIG. 1.) The time slots of such patterns are illustratively synchronized by the clock 14A (FIG. 2). The patterns appear on outputs 21 and 22 of controller 13A and are respectively applied to the radio modules 12A and 12B through the interfaces 11A and 11B.

As indicated above, such patterns are susceptible to collision in certain time slots. In further accordance with the invention, the terminal 20 is provided with facilities including a radio manager for predicting in which future time slots a collision between the corresponding channel hopping patterns will occur and for taking preemptive measures to avoid such collision.

Figure 3:
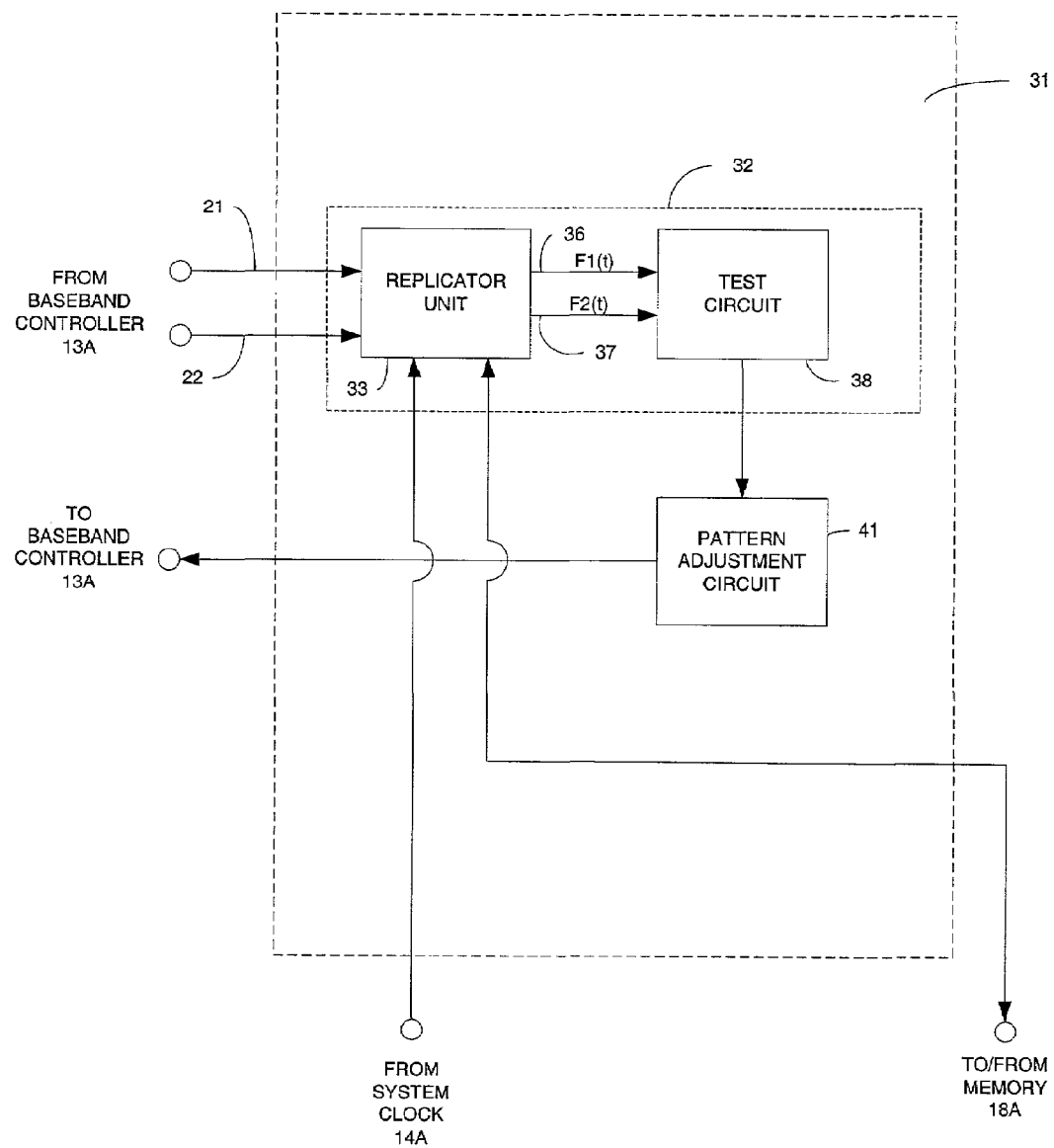
FIG. 3 is a block diagram of a radio manager employable in the terminal of FIG. 2 for preventing collision of the frequency hops present at the multiple interfaces of such terminal.
Figure 4A:
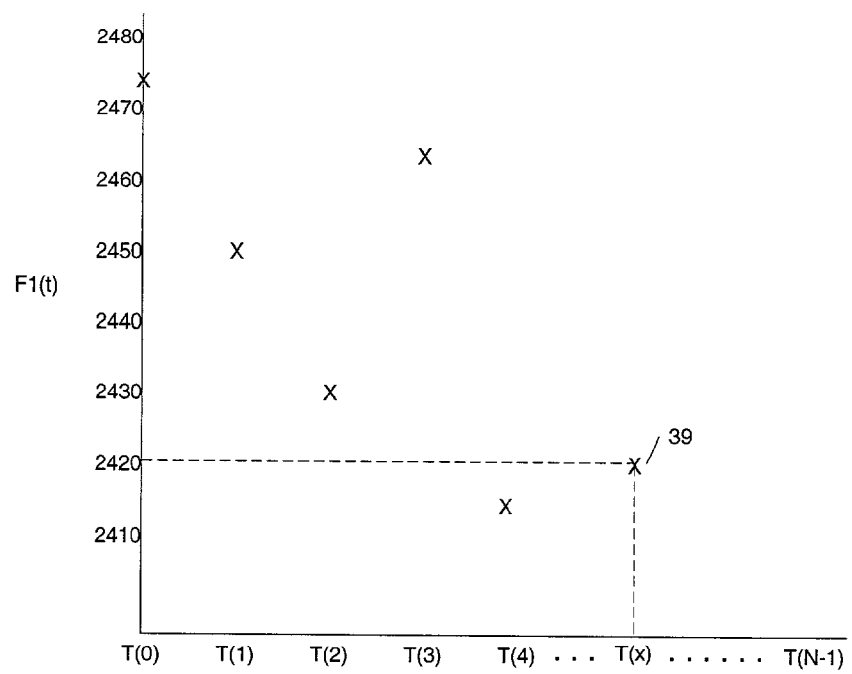
FIGS. 4A and 4B are time diagrams showing illustrative channel hopping segments that are expected to occur over a succession of future time slots at the respective radio interfaces in the terminal of FIG. 2.
Figure 4B:
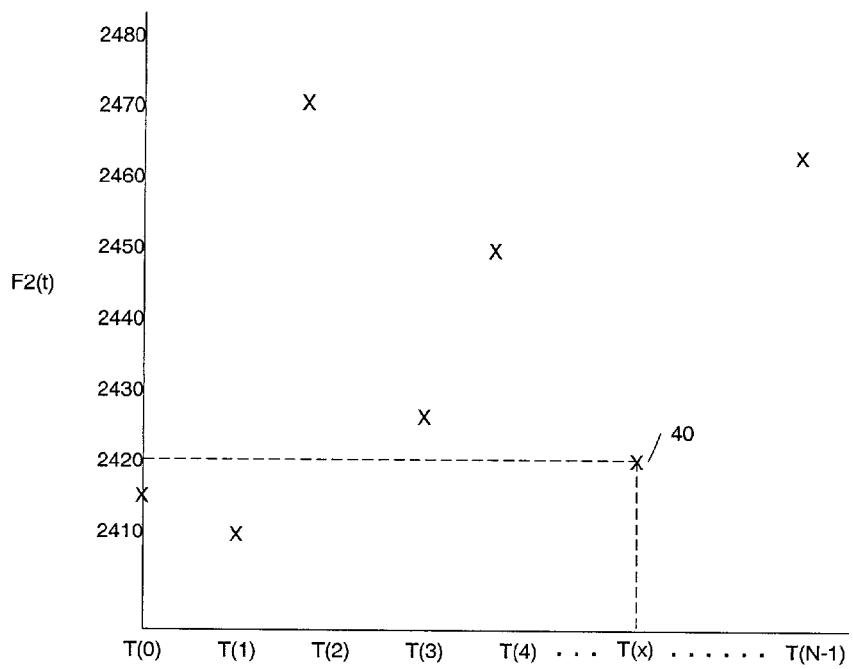

FIG. 3 shows an illustrative implementation of such a radio manager, represented at 31, for the assumed case where the terminal 20 exhibits the two interface arrangement of FIG. 2. The radio manager 31 includes a prediction circuit 32 (FIG. 3) that is coupled to the clock 14A and to the outputs 21 and 22 of the baseband controller 13A. The prediction circuit 32 illustratively includes a replicator unit 33 that extracts, for each of a selectable and incrementable number (illustratively N) of successive future time slots, corresponding segments F1(t) and F2(t) of the channel hopping patterns applied to the outputs 21 and 22. The respective segments occur over synchronized time slots T(0), T(1), T(2) . . . T(N−1) as shown in FIGS. 4A and 4B. Each frequency hop of each segment shown in FIGS. 4A and 4B is represented with a mark "X". The N-slot pattern segments F1(t) and F2(t) appear on outputs 36 and 37 of the replicator unit 33 (FIG. 3).

The prediction circuit 32 further illustratively includes a test circuit 38 which compares the frequency hops of the segments F1(t) and F2(t) in the successive associated time slots to determine which, if any, of the time slots reflects a coincidence of the hops. The output of the test circuit 38 exhibits a marker indicative of the time slot where the corresponding frequency hops coincide and therefore collide. For example, such marker would appear at the time slot T(X) in FIGS. 4A and 4B, since the respective then-occurring frequency hops (represented at 39 in FIG. 4A and at 40 in FIG. 4B) are both illustratively centered at 2420 MHz.

The output of the prediction circuit 32 is coupled to a pattern adjustment circuit 41. The circuit 41 responds to a marker from the test circuit 38 by directing the controller 13A to alter the prospective frequency hop on one of the colliding channels that would normally occur during the predicted time slot T(X). The adjustment circuit 41 may be implemented in several ways. For example, the circuit 41 may direct the controller 13A (FIG. 3) to mute transmission from one of the colliding channels during the time slot T(X). Alternatively, where the channel hopping patterns being transmitted employ packet sizes that encompass a selectable number of time slots as permitted by Bluetooth protocols, the adjustment circuit 41 may be implemented to direct the controller 13A to change the packet size of the transmitted data on the channel that is selected for alteration. (It will be appreciated that a collision would have to be predicted far enough in advance to afford sufficient time for the radio modules servicing the affected channel to negotiate and execute the packet size change.)

The replicator unit 33 may be arranged, with the aid of a memory 18A that may also be associated with the core 17A (FIG. 2), to extract successive N-slot segments F1(t) and F2(t) of the channel hopping patterns on the baseband controller outputs 21 and 22. In this way, the pattern of extraction, comparison testing and alteration just described can be repeatedly applied to a moving succession of future time slots and thereby to a corresponding moving succession of future collisions.

Figure 5:
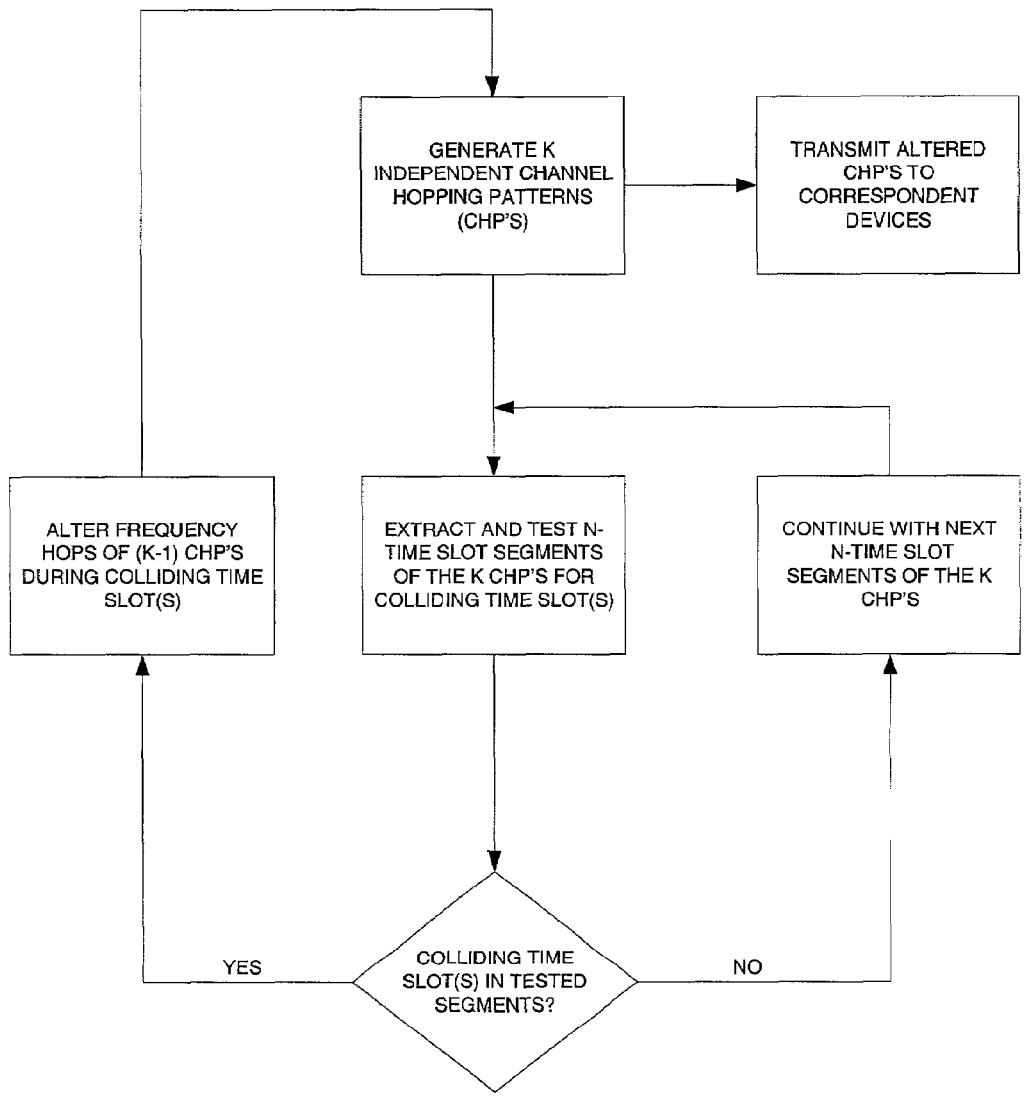
FIG. 5 is a flow chart of a typical sequence of operations used to implement a broad aspect of the invention.

The radio manager 32 just described, and the methods implemented thereon, are readily extensible to the general case of a K-interface terminal (not shown), where K is at least two. Such extension is depicted in the flow diagram of FIG. 5, wherein K sets of corresponding N-time slot segment are extracted in sequence from each of K independent Bluetooth channel hopping patterns generated by the such terminal. Each successive set is tested to predict the occurrence of a possible colliding time slot(s) during the N-time slot interval defining such set. If no collision between frequency hops is predicted during an interval corresponding to a currently extracted set, the next set is extracted and tested. If, on the other hand, a collision is predicted for the current set, the predicted time slot is employed as a parameter in the alteration of the frequency hops that would otherwise occur during such time slot in a subset of the K channel hopping patterns from which the segments were extracted. Preferably, such subset includes all but one, or (K−1), of such patterns. The K channel hopping patterns from the terminal, including the K−1 patterns that have ben altered as indicated, may be conventionally transmitted over the appropriate Bluetooth channels to the associated correspondent devices.

Figure 6:
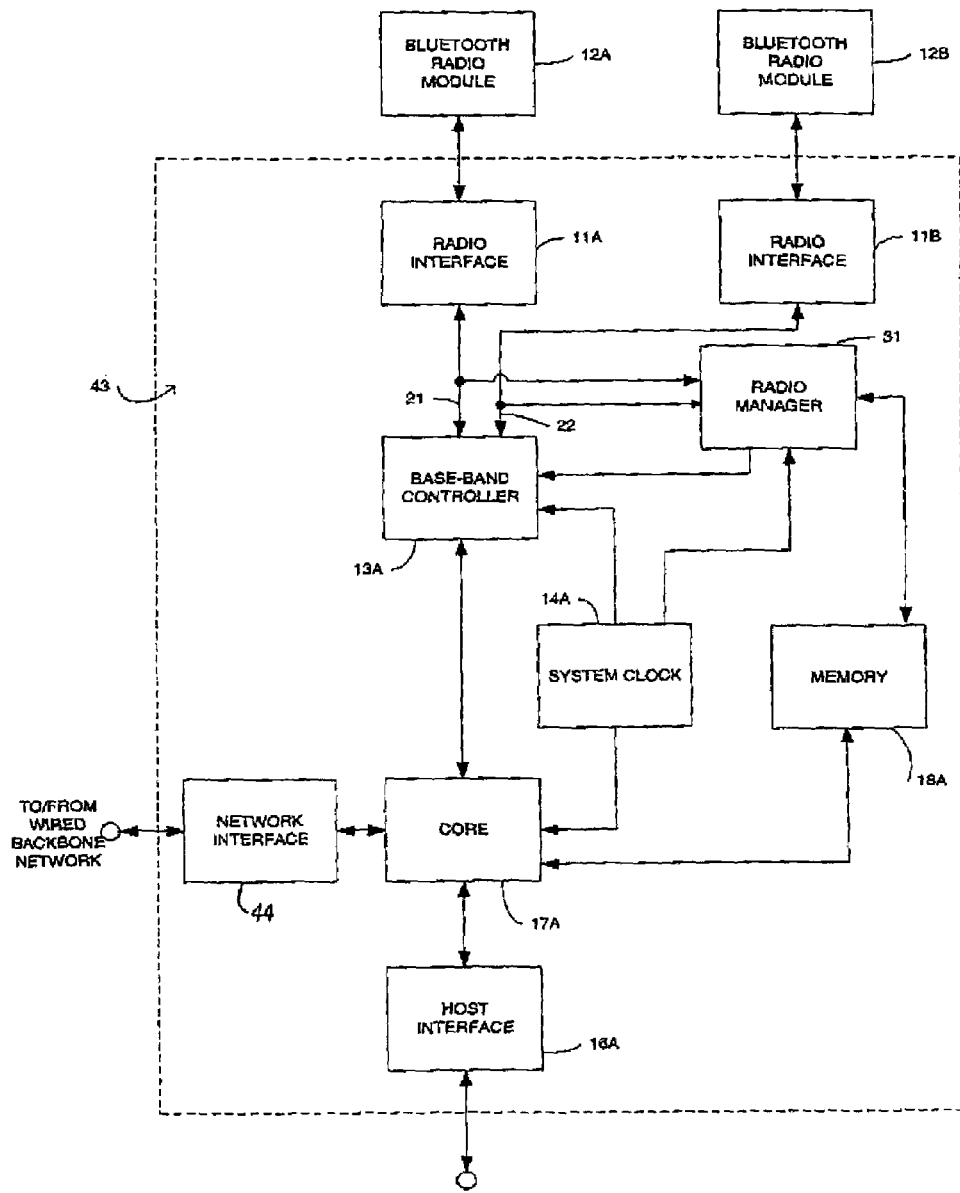
FIG. 6 is a block diagram of an alternate embodiment of the terminal of FIG. 2 in the form of a Bluetooth access point.

FIG. 6 shows a modification of the unitary Bluetooth-enabled terminal 20 of FIG. 2 wherein the modified terminal may serve as an enhanced Bluetooth access point. (Corresponding elements in FIGS. 2 and 6 have been given corresponding reference numerals). The access point of FIG. 6, represented at 43, is similar to and shares the above-mentioned advantages with the terminal 20 of FIG. 2. In addition, however, the access point 43 (FIG. 6) includes a network interface 44 which is coupled to the core 17A for supporting transmission between the access point 43 and a conventional wired backbone network (not shown). The interface 44 permits connectivity between such backbone network and a selected one of the radio modules 12A and 12B.

The interface 44 may conventionally be embodied for wired connection to such backbone network. Alternatively, the interface 44 may be embodied in wireless form in order to connect to the backbone network through a separate wireless network (not shown).

In the foregoing, the invention has been described in connection with illustrative embodiments thereof. While the specific embodiments of a unitary Bluetooth terminal shown in FIGS. 2 and 6 are provided with two radio interfaces, it will now be evident to those skilled in the art that any reasonable number of such interfaces may be employed without departing from the spirit and scope of the invention. Many other variations and modifications will also occur to those skilled in the art. For example, while the radio manager 31 has been illustrated in FIG. 3 in connection with one arrangement for effecting collision-resistant transmission of packets through such radio interfaces, it will be understood that other equivalent means may be employed for this purpose. It is accordingly desired that the scope of the appended claims not be limited to or by the specific disclosure herein contained.

What is claimed is:

1. A method for avoiding transmission interference between transmission paths over which packets are transmitted to separate Bluetooth-enabled elements in independent channel hopping patterns exhibiting quasi-random frequencies in successive time slots, the respective patterns each having a packet sized equal to a selectable number of time slots and wherein frequency collisions can occur between transmissions on a pair of channels, said method comprising the steps of:

extracting corresponding segments of the respective channel hopping patterns that occur over a selectable number of future time slots, comparing the corresponding extracted segments to detect a first future time in which the frequency hops of the corresponding segments coincide indicating a predicted frequency collision between transmissions on a pair of channels, and changing the size of the packets on one of the channels to allow transmission to proceed simultaneously on both of the channels where the collision was predicted.

2. A Bluetooth-enabled terminal for the simultaneous transmission of packets over channels to separate Bluetooth enabled devices without loss of packet communication due to collisions in channel time slots, said terminal comprising a pair of radio interfaces for transmission of packets to separate Bluetooth elements, a base band controller for modulating the frequencies to be transmitted to the Bluetooth elements with separate channel hopping patterns exhibiting frequency hops in successive time slots, said frequencies being within a band defined by Bluetooth protocols, a prediction circuit for predicting a future time slot when the frequency hops of the respective channel hopping patterns will coincide and cause a collision in a time slot, and a pattern adjustment circuit responsive to said prediction circuitry for causing said base band controller to alter the frequency hops on one of the channels to change the size of the packets on said one channel to allow transmission to proceed simultaneously on both of the channels where the collision was predicted.

3. The Bluetooth-enabled terminal of claim 2 wherein said prediction circuit comprises a replicator unit that extracts for future time slots corresponding segments of the channel hopping patterns and a test circuit which compares the frequency hops of the corresponding segments to determine which, if any, of the time slots reflect a coincidence of the hops, thereby indicating a potential collision.

4. The Bluetooth-enabled terminal of claim 3 further comprising a memory connected to said replicator unit, a core connected to said base band controller and said memory, and a system clock connected to said core and said base band controller.

* * * * *

UNITED STATES PATENT AND TRADEMARK OFFICE
CERTIFICATE OF CORRECTION

PATENT NO.         : 7,016,396 B2                                        Page 1 of 1
APPLICATION NO.    : 10/054134
DATED              : March 21, 2006
INVENTOR(S)        : Agrawal et al.

It is certified that error appears in the above-identified patent and that said Letters Patent is hereby corrected as shown below:

In the Specification

In Column 4, Line 9, delete "channels that" and
insert -- channels [illustratively the F1(t) frequency hop 39 in Fig. 4A] that --, therefor.

In Column 4, Line 34, delete "radio manager 32" and insert -- radio manager 31 --, therefor.

In Column 4, Line 53, delete "ben" and insert -- been --, therefor.

Signed and Sealed this
Thirtieth Day of December, 2014

Michelle K. Lee
*Deputy Director of the United States Patent and Trademark Office*